United States Patent

[11] 3,542,155

| [72] | Inventors | Raymond A. Kern<br>Indianapolis;<br>James F. Price, Greensburg, Indiana |
|---|---|---|
| [21] | Appl. No. | 729,100 |
| [22] | Filed | May 14, 1968 |
| [45] | Patented | Nov. 24, 1970 |
| [73] | Assignee | FMC Corporation<br>a corporation of Delaware |

[54] LUBRICATION FITTING
4 Claims, 3 Drawing Figs.

[52] U.S. Cl. .................................................. 184/105, 137/521
[51] Int. Cl. .............................................. F16n 21/02
[50] Field of Search ......................................... 184/105, 105B; 137/68, 521, 234.5, 454.2

[56] References Cited
UNITED STATES PATENTS

| 1,928,841 | 10/1933 | Morse | 184/105X |
| 2,254,502 | 9/1941 | Thomas et al. | 184/105X |
| 2,922,435 | 1/1960 | Edwards | 137/521 |
| 3,116,747 | 1/1964 | Cowles et al. | 137/68 |
| 3,149,697 | 9/1964 | Bendeich et al. | 184/105X |

Primary Examiner—Manuel A. Antonakas
Attorney—Birch, Swindler, McKie & Beckett

ABSTRACT: A ball check valve type of lubrication fitting having a unitary tubular housing formed of a resilient deformable material with a series of axially spaced outwardly extending concentric ribs circumferally formed on the exterior surface of the housing for engaging the interior wall surfaces of a complementary mounting opening and deforming in a manner to retain the fitting in the opening.

Patented Nov. 24, 1970 3,542,155
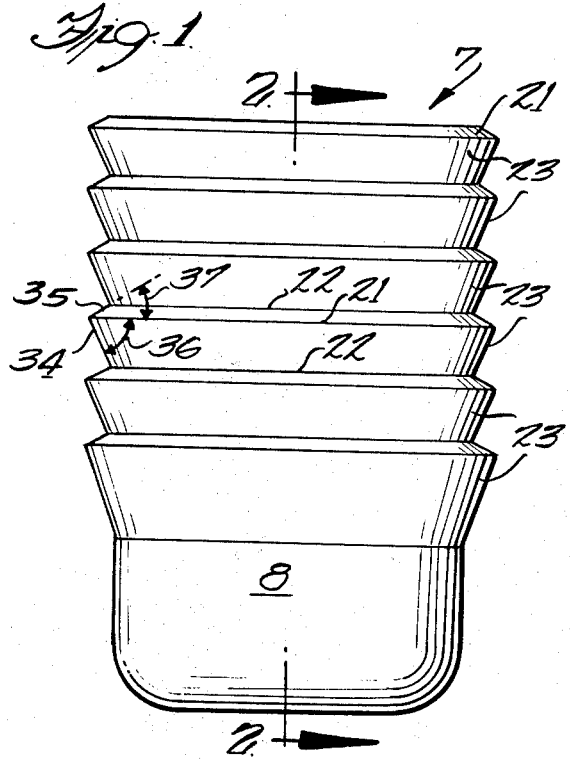
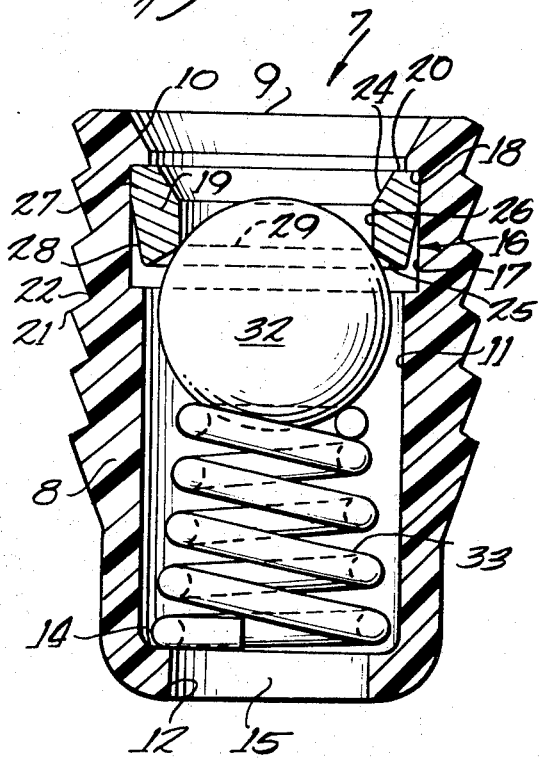
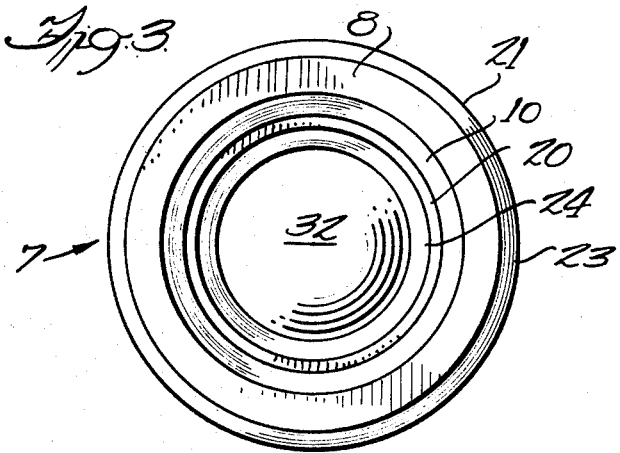
Inventors
Raymond A. Kerr
James F. Price

LUBRICATION FITTING

BACKGROUND OF THE INVENTION
1. Field of the Invention

This invention relates generally to lubricating apparatus and more particularly to an improved lubrication fitting for providing direct access to internal bearing surfaces of a machine such that a lubricant may be readily delivered through the fitting the proper lubricating areas of the machine and retained therein.

2. Description of the Prior Art

The purpose for lubricating a mechanical device is to provide a coating of lubricant between the engaging surfaces of movable elements so as to reduce the friction and retard the wear therebetween. To be effective, the lubricant should be delivered in a manner to readily reach the bearing surfaces of the moving elements. In an effort to facilitate the lubrication of bearings, joints, and the like, it has become a usual practice to provide lubrication fittings at selected locations for providing a readily accessible entrance opening through which the lubricant can be delivered to the internal moving elements.

The lubrication fittings presently used have a housing with either a threaded or a nonthreaded exterior surface which is utilized to mount and retain the fitting in the associated opening of the machine. A fitting having a threaded exterior surface is designed to be screwed into its complementary threaded mounting hole located on the machine, while a fitting having a nonthreaded exterior surface is designed to be press fitted into its complementary mounting hole. This last-mentioned type of lubrication fitting relies solely on the interference conditions and high frictional forces existing between the surface to surface contact of the exterior surface of the housing and the interior wall surfaces of the mounting hole to retain the lubrication fitting therein. The aforementioned threaded and nonthreaded lubrication fittings are designed for use with threaded and nonthreaded mounting holes respectively, and a fitting which is designed for use with one type of mounting hole cannot be properly inserted and retained in the other type of mounting hole without first employing the use of a suitable adapter. It would therefore be desirable to have one fitting suitable for use in either type of mounting hole, thereby reducing the associated production costs, inventory requirements, and possibilities of errors in mounting the fitting properly.

In applications where a lubrication fitting is employed in an environment which is highly inducive to corrosive effects, it is impractical to use a fitting which has not been properly treated for corrosion protection. In this type of application it has been the common practice to use a lubrication fitting constructed of either stainless steel or of a metal housing which has been treated and plated with a corrosion resistant material, the former being much more expensive but frequently preferred due to its permanent corrosion resistant features. Since the tooling, manufacturing, and assembly costs for a stainless steel lubrication fitting are greater than the comparative costs for a plated fitting or a regular steel fitting, it would appear to be desirable to have a lubrication fitting which would have the permanent noncorrosive low maintenance features of stainless steel at a substantially lower cost.

As seen by the previous discussion of lubrication fittings, it would be desirable to have a lubrication fitting which would be (1) suitable for use in a complementary mounting hole having either a threaded or a nonthreaded interior surface; (2) constructed of an inherently noncorrosive material for permanent corrosion protection with a minimum of required maintenance; and (3) easily and inexpensively manufactured resulting in lower overall production and sales costs.

SUMMARY OF THE INVENTION

This invention provides a lubrication fitting of the self-closing ball check valve type having a housing constructed of a moldable noncorrosive material of sufficient elasticity and shear strength to overcome the physical stresses placed on the fitting, and which is designed for insertion into a complementary threaded or nonthreaded mounting hole in the associate device or machine. For proper operation of a lubrication fitting it is required that the exterior wall surfaces of the housing form a lubricant tight seal with the interior wall surfaces of the mounting hole so as to prevent the passage of lubricant therebetween. In the past this has raised a problem when one type of lubrication fitting was to be installed in mounting holes having different types of interior wall surfaces. In the invention disclosed in this application, this problem is overcome by providing a series of integrally formed axially spaced radially extending circumferal ribs on the outside surface of the housing which deform when the fitting is press fitted into the mounting hole such that the ribs form a lubricant tight seal with the interior wall surfaces of the hole. Furthermore, the interference conditions and frictional forces existing between the ribs and the interior surface of the hole serve to hold the fitting in place against any twisting type of forces which may be applied to the fitting. In addition, the ribs are designed such that should the back pressure of the lubricant in the machine tend to axially displace the fitting outwardly from its mounting hole, the deformation of the ribs will increase in a manner to increase their pressure and grip against the interior wall surface of the hole so as to retain the fitting properly positioned therein. In this way the lubrication fitting is locked firmly in place and resists those forces tending to displace it.

Other features and advantages of this invention will be apparent during the course of the following description.

BRIEF DESCRIPTION OF THE DRAWINGS

In the accompanying drawings forming a part of this specification, and in which like reference characters are employed to designate like parts throughout the same:

FIG. 1 is a side elevational view of a lubrication fitting having axially spaced radially extending circumferal ribs formed integral with the housing;

FIG. 2 is a sectional view taken on line 2-2 of FIG. 1; and

FIG. 3 is a plan view of the lubrication fitting illustrated in FIG. 1.

DESCRIPTION OF THE PREFERRED EMBODIMENT

In the drawings, wherein for the purpose of illustration is shown a preferred embodiment of the invention, and referring to FIGS. 1 through 3 inclusive, there is indicated generally a lubrication fitting 7 having a generally tubular housing 8 made of a resilient deformable plastic material, such as Delrin, and which is of such a configuration that it may be inexpensively manufactured in one piece by injection molding procedures. The upper end of the housing 8 has a circular inlet aperture 9 with an inverted frustoconical interior surface 10 which merges with a cylindrical passageway 11 axially extending through the center of the housing. The passageway 11 being terminated at its lower end by an inwardly projecting annular flange portion 12 that serves to define an annular horizontal spring seat 14 and a circular outlet aperture 15. An annular groove 16 having an interior surface 17 is formed in the upper portion of the passageway 11 so as to define an annular shoulder portion 18, the annular groove being further described later in this application for use in conjunction with a retainer ring 19.

The exterior surface of the housing 8 has a series of parallel alternately disposed lands 21 and grooves 22 which serve to define a series of parallel circumferal ribs 23 concentrically formed integral with the housing and extending radially outward therefrom, a more detailed description of these ribs being presented later in this application.

The retainer ring 19 has a top surface 20 with an inverted frustoconical aperture 24 formed therein, and a frustoconical aperture 25 forms the bottom surface, the two apertures being interconnected by a cylindrical opening 26 axially extending therebetween through the retainer ring. Adjacent the upper surface 20 the retainer ring 19 has a cylindrical exterior surface 27 that merges with an inverted frustoconical exterior surface 28 adjacent the lower surface of the retainer ring. A valve seat 29 is defined as being substantially along the line of intersection of the side wall surface of the cylindrical opening 26 and the surface of the frustoconical aperture 25. The diameter of the cylindrical exterior surface 27 of the retainer ring 19 is equal to or slightly greater than the diameter of the annular groove 16, and the retainer ring is positioned in the annular groove such that its exterior surface 27 and the upper surface 20 tightly abut against the interior surface 17 and shoulder portion 18 respectively of the annular groove so as to form a lubricant tight seal therebetween. When the retainer ring is properly positioned in the annular groove, the conical surface of the aperture 24 lies in the same conical plane as the conical surface 10 of the inlet aperture 9. It is to be noted that the inverted frustoconical exterior surface 28 serves as a wedge to permit the insertion of the retainer ring 19 through the inlet aperture 9 and into engagement with the annular groove 16. The retainer ring 19 is preferably fabricated of the same material as the housing 8 so that it may also be inexpensively manufactured, however other suitable materials may also be used.

Disposed within the housing 8 is a valve member 32, preferably in the form of a sphere, which is arranged to engage the valve seat 29 for closing the passageway 11. The valve member 32 is resiliently supported on the upper end of a conical helically wound spring 33 which serves to bias the valve member into a normally seated position with the valve seat 29, the lower end of the spring resting on the spring seat 14. The effect of the spring 33 urging the valve member 32 against the valve seat 29 in the retainer ring 19 also serves to retain the normally abutting relationship between the upper end 20 of the retainer ring and the shoulder portion 18 of the annular groove.

The lubrication fitting 7 is installed in a complementary mounting opening in an associated structure or machine by simply forcing the housing 8 axially downward into the mounting opening until it is seated therein with the top end being in the plane of, but preferably slightly below, the top exterior surface of the structure with which it is associated. In this position the ribs 23 have assumed a deformed position in which they lock the lubrication fitting 7 firmly in place due to the interference fit and frictional forces existing between the ribs and the interior surface of the mounting opening. In addition, should the back forces of the lubricant attempt to axially displace the fitting 7 from its installed position, the ribs 23 are of a shape which is designed to increase the pressure and thus the grip of the ribs against the interior surface of the mounting opening so as to resist any axial outward displacement of the fitting.

Each of the ribs 23 is herein defined as including a land 21 at its apex and the immediately adjacent grooves 22 located immediately above and below the land. Each land 21 is connected with the groove 22 located immediately therebeneath by an inverted frustoconical surface 34, and with the groove located immediately thereabove by a frustoconical surface 35. Tests were conducted to determine the most desirable range of apex angular relationships between the surfaces 34 and 35 such that the deformation of the ribs 23 when the fitting 7 is installed into its complementary mounting opening would provide the preferred holding strength to retain the fitting properly positioned therein. The results of these tests indicated that the most desirable holding strength was realized when the surfaces 34 were taken at an angle of substantially 70° downwardly from the plane of the lands 21, and when the surfaces 35 were taken at an angle of substantially 30° upwardly from the plane of the lands 21, these angles being assigned reference characters 36 and 37 respectively. It is to be noted that the angles 36 associated with surfaces 35 may also be in a downward direction similar to angle 37 and the fitting will still be retained in the opening but not as securely as when the angles are as given herein. The tests further indicated that the angle 36 may come within the range of about 65° to about 78° without detracting significantly from the efficiency of the ribs 23 to retain the fitting 7 in its mounting opening. It is thus seen that the most desirable apex angular relationship of the combined adjacent angles 36 and 37 as viewed from this apex juncture at each of the lands 21 lies in the range of from about 95° to about 108°.

In operation, the lubrication fitting 7 is mounted in the structure with which it is associated and the nozzle of a lubricant dispensing apparatus, not shown, is axially inserted into both the inlet aperture 9 and the aperture 24 in a manner to unseat the valve member 32. This permits the lubricant to be dispensed past the valve member 32 and through the lubrication fitting 7 into the lubrication area in the associated structure. Since the conical wall surfaces of the apertures 9 and 24 lie in the same conical plane with each other, a conical nozzle may be used on the lubricating dispensing apparatus such that the exterior surface of the nozzle will abut against the interior wall surfaces of either or both of the apertures so as to limit the inward movement of the nozzle into the fitting 7, thus limiting the corresponding inward movement of the valve member 32 as it is forced off its valve seat 29 by the nozzle. It is apparent to those skilled in the art that such a means to limit the inward axial movement of the valve member 32 so as not to block the passageway 11 in the housing 8 is required if the lubricant is to pass through the lubrication fitting 7. Of course, any other means adapted to limit the inward movement of the valve member 32 would also be satisfactory as long as it permitted for the proper operation of the lubrication fitting 7. After the lubrication dispensing apparatus has been removed from the lubrication fitting 7, the spring 33 returns the valve member 32 into a seated position with the valve seat 29 thus preventing the reverse flow of the lubricant through the lubrication fitting.

It is to be understood that the form of this invention herewith shown and described is to be taken as a preferred example of the same, and that various changes in the shape, size, and arrangement of parts may be resorted to without departing from the spirit of the invention or the scope of the subjoined claims.

We claim:
1. A lubrication fitting comprising:
 a resilient deformable housing for insertion into a complementary mounting opening, said housing having a passageway extending therethrough,
 a ball in said passageway,
 retaining means adjacent one end of said housing retaining said ball against expulsion from said one end of said housing to form a ball check valve for containing lubricant under pressure within said passageway,
 a plurality of resilient deformable radially projecting ribs formed on the exterior surface of said housing outwardly of said passageway, said ribs upon engagement with the interior surface of the mounting opening deforming in a manner to hold the fitting therein, and lubricant pressure within said passageway acting to deform said housing and force said ribs into tighter engagement with the mounting opening to lock the fitting firmly in place and resist forces tending to displace it from the mounting opening.

2. A fitting as described in claim 1 further characterized by the ribs having a substantially triangular cross section and wherein the apex angle of the triangularly shaped ribs is from about 95° to about 108°.

3. A fitting as described in claim 1 further characterized by the ribs being disposed around the housing substantially perpendicular to the axis of the housing and projecting radially outward from the exterior surface thereof.

4. A fitting as described in claim 1 further characterized by said ribs being integral with the housing.